(12) United States Patent
Krieger et al.

(10) Patent No.: US 11,774,386 B2
(45) Date of Patent: Oct. 3, 2023

(54) METHOD FOR DETERMINING AN AGGREGATE STATE OF AQUEOUS OPERATING LIQUID IN AN OPERATING LIQUID CONTAINER FOR A MOTOR VEHICLE, AND OPERATING LIQUID CONTAINER FOR CARRYING OUT THE METHOD

(71) Applicant: KAUTEX TEXTRON GmbH & Co. KG, Bonn (DE)

(72) Inventors: Karl-Ludwig Krieger, Brinkum (DE); Jakob Happel, Brinkum (DE); Hartmut Wolf, Konigswinter (DE)

(73) Assignee: KAUTEX TEXTRON GmbH & Co. KG, Bonn (DE)

( * ) Notice: Subject to any disclaimer, the term of this patent is extended or adjusted under 35 U.S.C. 154(b) by 299 days.

(21) Appl. No.: 16/958,569

(22) PCT Filed: Dec. 13, 2018

(86) PCT No.: PCT/EP2018/084774
§ 371 (c)(1),
(2) Date: Jun. 26, 2020

(87) PCT Pub. No.: WO2019/129503
PCT Pub. Date: Jul. 4, 2019

(65) Prior Publication Data
US 2021/0063333 A1 Mar. 4, 2021

(30) Foreign Application Priority Data
Dec. 28, 2017 (DE) .......................... 102017131390.7

(51) Int. Cl.
*G01N 27/02* (2006.01)
*G01N 27/22* (2006.01)

(52) U.S. Cl.
CPC ......... *G01N 27/026* (2013.01); *G01N 27/228* (2013.01)

(58) Field of Classification Search
CPC ..... G01N 27/026; G01N 27/228; G01N 27/22
See application file for complete search history.

(56) References Cited

U.S. PATENT DOCUMENTS

| 4,857,829 A | 8/1989 | Sagae et al. |
| 5,050,431 A | 9/1991 | McDonald |

(Continued)

FOREIGN PATENT DOCUMENTS

| CN | 104880234 A | * 9/2015 | ............ G01R 23/26 |
| CN | 106918628 | 7/2017 | |

(Continued)

OTHER PUBLICATIONS

M. Flatscher et al., "Measurement of complex dielectric material properties of ice using electrical impedance spectroscopy," 2016 IEEE Sensors, 2016, pp. 1-3, doi: 10.1109/ICSENS.2016.7808533 (Year: 2016).*

(Continued)

*Primary Examiner* — Alexander Satanovsky
*Assistant Examiner* — Asm Fakhruddin
(74) *Attorney, Agent, or Firm* — Lee & Hayes, P.C.

(57) ABSTRACT

A method for determining an aggregate state of an operating liquid in an operating liquid container for a motor vehicle, which operating liquid container has at least one capacitor fastened to a container wall of the operating liquid container and has a first electrode and a second electrode opposite said first electrode. A first method determines the aggregate state of the operating liquid by means of a frequency-dependent phase profile of the impedance of the at least one capacitor. Another method determines the aggregate state of the operating liquid by means of a frequency-dependent capacitance (Continued)

Figure 1:
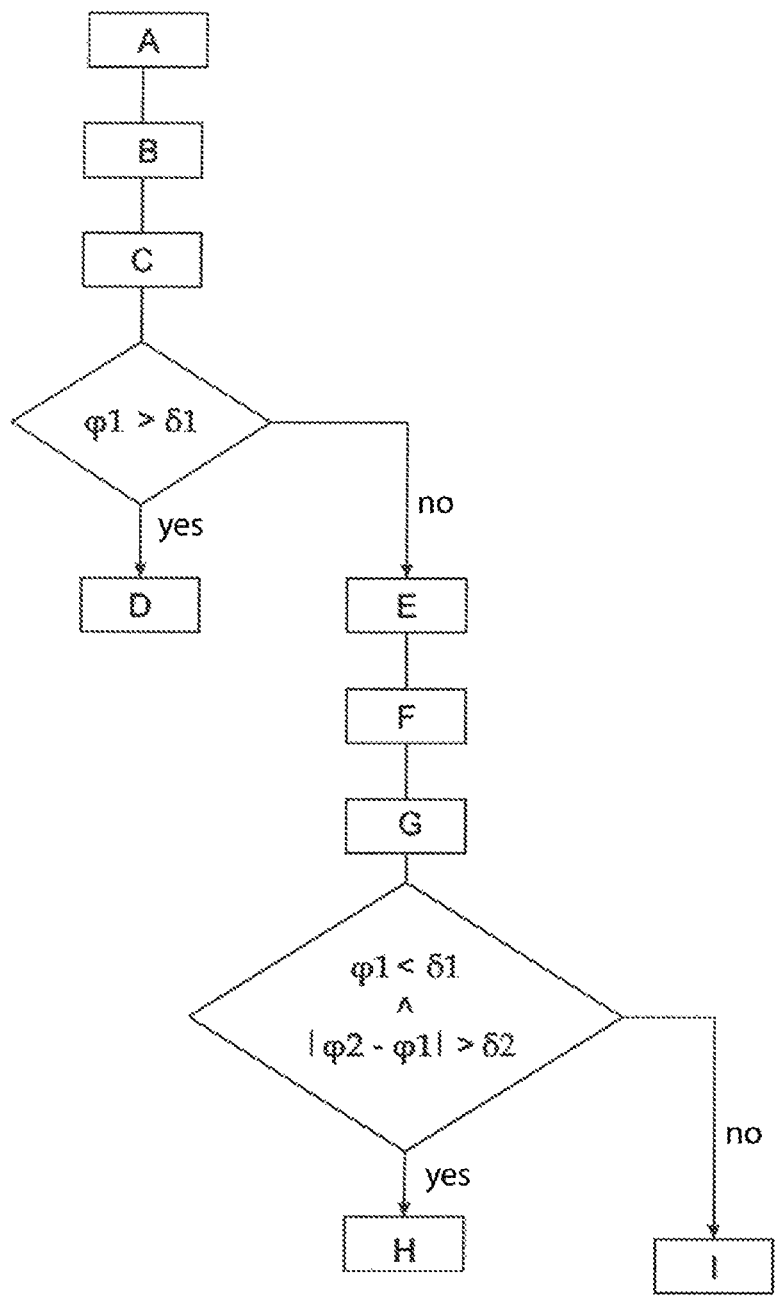

profile of the at least one capacitor. Further, an operating liquid container is designed for carrying out the methods.

14 Claims, 7 Drawing Sheets

(56) References Cited

U.S. PATENT DOCUMENTS

| | | | | |
|---|---|---|---|---|
| 7,439,877 | B1 * | 10/2008 | Jarvinen | B64D 15/20 |
| | | | | 340/581 |
| 9,465,000 | B1 | 10/2016 | Brown et al. | |
| 2004/0223021 | A1 | 11/2004 | Farr et al. | |
| 2004/0257094 | A1 * | 12/2004 | Halalay | G01N 27/02 |
| | | | | 324/698 |
| 2008/0164223 | A1 * | 7/2008 | Wilson | C02F 1/003 |
| | | | | 210/348 |
| 2013/0221986 | A1 | 8/2013 | Riegel | |
| 2014/0375321 | A1 | 12/2014 | Ikeya | |

FOREIGN PATENT DOCUMENTS

| | | | | |
|---|---|---|---|---|
| DE | 102004026637 | | 12/2005 | |
| DE | 69831313 | | 6/2009 | |
| DE | 102009028459 | | 2/2011 | |
| DE | 102012020335 | | 4/2014 | |
| DE | 10309769 | B4 * | 10/2017 | B60S 1/50 |
| EP | 1596188 | | 11/2005 | |
| EP | 1637875 | | 3/2006 | |
| EP | 2902774 | | 8/2015 | |
| EP | 3270161 | | 1/2018 | |
| JP | H05004369 | | 8/1994 | |
| JP | H06058358 | | 8/1994 | |
| JP | 07-005135 | A * | 1/1995 | G01N 27/00 |
| JP | H075135 | | 1/1995 | |
| JP | 2001223039 | A * | 8/2001 | H01R 9/06 |
| JP | 2002504226 | | 2/2002 | |
| JP | 2004184192 | | 7/2004 | |
| JP | 2006162593 | | 6/2006 | |
| JP | 2009110849 | | 5/2009 | |
| JP | 2009110849 | A * | 5/2009 | G01N 27/22 |
| JP | 2009210314 | | 9/2009 | |
| JP | 2015040841 | | 3/2015 | |
| KR | 950012792 | B1 * | 10/1995 | B32B 21/10 |
| WO | WO9846985 | | 10/1998 | |
| WO | WO2008080865 | | 7/2008 | |
| WO | WO2012005634 | | 1/2012 | |
| WO | WO2012107568 | | 8/2012 | |
| WO | WO-2015199661 | A1 * | 12/2015 | E21B 33/14 |
| WO | WO2016147747 | | 9/2016 | |

OTHER PUBLICATIONS

El-Raouf, M. (2017). "Completely automated system for capacitance measurement through new accurate capacitance box", International Journal of Metrology and Quality Engineering. 8. 22. 10.1051/ijmqe/2017017 (Year: 2017).*

N. L. Dao, "A comparison between LDPE and HDPE cable insulation properties following lightning impulse ageing," 2010 10th IEEE International Conference on Solid Dielectrics, 2010, pp. 1-4, doi: 10.1109/ICSD.2010.5567944 (Year: 2010).*

PCT International Preliminary Report on Patentability for corresponding PCT Application No. PCT/EP2018/084774, dated Jul. 23, 2020, 10 pages.

Flatscher, M. et al., "Measurement of Complex Dielectric Material Properties of Ice using Electrical Impedance Spectroscopy", 2016 IEEE Sensors, IEEE Oct. 30, 2016, 4 pages.

PCT Search Report for corresponding PCT International Application No. PCT/EP2019/084774 dated Jun. 11, 2019, 21 pages.

Japanese Office Action, dated Aug. 2, 2021, for Application No. 2020-536007 corresponding to U.S. Appl. No. 16/958,569 "Method for Determining an Aggregate State of Aqueous Operating Liquid in an Operating Liquid Container for a Motor Vehicle, and Operating Liquid Container for Carrying out the Method" Krieger,K., 2 pages.

Chinese Office Action dated Oct. 21, 2022, for CN Patent No. 201880083659.4 a foreign counterpart to U.S. Appl. No. 16/958,569, 12 pages.

* cited by examiner

METHOD FOR DETERMINING AN AGGREGATE STATE OF AQUEOUS OPERATING LIQUID IN AN OPERATING LIQUID CONTAINER FOR A MOTOR VEHICLE, AND OPERATING LIQUID CONTAINER FOR CARRYING OUT THE METHOD

This Application claims priority to PCT Application No. PCT/EP2018/084774, filed Dec. 13, 2108, which claims priority to German Patent Application No. 10 2017 131390.7, filed Dec. 28, 2017, the contents of each of which is incorporated herein by reference.

The present invention relates to a method for determining an aggregate state of an aqueous operating liquid in an operating liquid container for a motor vehicle. The present invention further relates to an operating liquid container for carrying out the method.

In the following, reference shall also be made to operating liquid containers designed as water containers which are designed for use in a motor vehicle. Operating liquid containers according to the invention are, particularly but not exclusively, water containers for motor vehicles for storing, for example, water to be injected into an intake system of an internal combustion engine, urea containers, windshield washer fluid containers, additional liquid containers, or additive containers for motor vehicles. Containers of the initially described type are frequently produced using extrusion blow molding, wherein HDPE (high density polyethylene) is particularly suitable for producing extrusion blow molded containers. It is further possible to produce respective operating liquid containers by means of an injection molding process.

Water injection is a method for increasing the performance of internal combustion engines. In order to ensure that the maximum temperature is not exceeded at peak performance, distilled water is injected into the intake system of an internal combustion engine. The evaporating liquid has a cooling effect and decreases the compression effort. Injection during the combustion cycle for producing steam power and reducing the exhaust gas temperature and thus for reducing the exhaust gas back pressure is also practiced. By means of water injection, the exhaust emissions, particularly of nitric oxide, of combustion engines can be reduced. Due to the evaporation heat to be generated, the water injected into the air intake system effects an effective intercooling, thus also achieving an internal cooling of the engine. The colder combustion air and thus its greater density results in an increase in performance.

A precondition for the water injection is that the water stored in the operating liquid container is in a liquid aggregate state, so that the water can be conveyed by means of a pump. The same also applies, for example, to a urea solution stored in an operating liquid container. At temperatures around the freezing mark, the water within the operating liquid container can be partially in a solid and partially in a liquid aggregate state, so that, in some circumstances, the water can possibly be conveyed by means of a pump. At temperatures significantly below the freezing mark, the operating liquid is largely or completely frozen, so that the aqueous operating liquid cannot be conveyed. As soon as the operating liquid is in a partially solid aggregate state, i.e., as soon as there is ice in the operating liquid container, a delivery of the operating liquid is no longer ensured, so that countermeasures must be taken. For example, operation of the motor vehicle can be prevented as long as the operating liquid cannot be conveyed. In addition, a heating device for heating the operating liquid located in the operating liquid container is activated.

The problem addressed by the present invention is that of providing a method for determining an aggregate state of an aqueous operating liquid in an operating liquid container for a motor vehicle.

The problem addressed by the present invention is solved by the features of claim 1. Advantageous embodiments of the method are described in the claims dependent on claim 1.

More precisely, the problem addressed by the present invention is solved by a method for determining an aggregate state of an operating liquid in an operating liquid container for a motor vehicle, wherein the operating liquid container has at least one capacitor which is fastened to a container wall of the operating liquid container and has a first electrode and a second electrode opposite said first electrode. The method according to the invention is characterized by the following method steps A, B, C, and D:

A) Applying at least a first alternating voltage to the capacitor, wherein a first frequency of the first alternating voltage corresponds to a lower frequency limit;
B) determining and storing a first impedance of the capacitor for the first frequency;
C) determining a first phase angle from the first impedance; and
D) determining that the operating liquid located in the operating liquid container is in a solid aggregate state when the first phase angle is greater than a first critical angle.

The method according to the invention is advantageous because determining or ascertaining whether the operating liquid stored in the operating liquid container is in a solid aggregate state and is thus present as ice, is possible in a reliable manner without direct contact of measuring device, in the present case the capacitor, with the operating liquid. The impedance of the at least one capacitor and the phase angle resulting from the impedance correlate with the aggregate state of the operating liquid stored in the operating liquid container. Therefore, by determining the impedance and/or the phase angle resulting from the impedance, the aggregate state of the operating liquid located in the operating liquid container can be deduced.

The frequency-dependent impedance of the capacitor and the phase angle resulting from the impedance depend on the relaxation frequency of the materials that are penetrated by the alternating electric field between the first electrode and the second electrode. Therefore, the frequency-dependent impedance of the capacitor and the phase angle resulting from the impedance depend on the material of the container wall and the operating liquid located in the interior of the operating liquid container. Consequently, the frequency-dependent impedance of the capacitor and the phase angle resulting from the impedance depend on relaxation frequencies of the orientation polarization of the water molecules of the operating liquid. While the relaxation frequency for water in the liquid aggregate state lies in the range of a few GHz, the relaxation frequency for water in the solid aggregate state, i.e., for ice, lies in the range of a few kHz.

The applicant has found that the frequency-dependent size and the frequency-dependent profile of the phase angle resulting from the impedance of the capacitor allows for clear inferences about the aggregate state of the operating liquid stored in the operating liquid container. For example, the applicant has determined that the phase angle resulting from the impedance of the capacitor is greater for a frequency of the alternating voltage, which corresponds to a lower frequency limit, than a predetermined first critical angle when the operating liquid within the operating liquid container is in a solid aggregate state. In such case, the lower frequency limit of the alternating voltage applied to the capacitor depends on the geometry of the capacitor and the size of the electrodes of the capacitor and the distance of the electrodes of the capacitor from one another.

Preferably, the first critical angle is −85°. The lower frequency limit is preferably 10 kHz. Therefore, the phase angle resulting from the impedance of the capacitor is at least −85° at an alternating voltage applied to the capacitor, which has a frequency of 10 kHz when the operating liquid in the operating liquid container is in a solid aggregate state, i.e., when the aqueous operating liquid is frozen and present as ice.

The operating liquid container is preferably an operating liquid container for a motor vehicle. Further preferably, the operating liquid container is designed as a water container for a motor vehicle for receiving water which is provided for injection into an internal combustion engine of the motor vehicle. Further preferably, the operating liquid container is designed as a urea container for receiving an aqueous urea solution which is provided for injection into the exhaust gas system of an internal combustion engine.

Preferably, a stop signal is output when the first phase angle is greater than the first critical angle. By outputting the stop signal, an operation of the motor vehicle can be prevented.

In method step A, the lower frequency limit depends on the geometry and the dimensions of the capacitor and can thus vary. The lower frequency limit is particularly 10 kHz.

The phase angle is the angle between the voltage applied to the capacitor and the current flowing through the capacitor.

Consequently, the phase angle between the voltage and the current is determined in method step C.

Loss angle refers to the difference between −90° and the phase angle of the impedance.

Therefore, method step C can be formulated as follows: Determining a first loss angle of the capacitor for the first frequency. Method step D can subsequently be as follows: Determining that the operating liquid located in the operating liquid container is in a solid aggregate state when the first loss angle is greater than a first critical loss angle.

Preferably, the first critical loss angle is 5°. The lower frequency limit is preferably 10 kHz. Therefore, the loss angle resulting from the impedance of the capacitor is at least 50° at an alternating voltage applied to the capacitor, which has a frequency of 10 kHz when the operating liquid in the operating liquid container is in a solid aggregate state, i.e., when the aqueous operating liquid is frozen and present as ice.

Preferably, the method has the following method steps:
E) Applying a second alternating voltage to the capacitor, wherein a second frequency of the second alternating voltage corresponds to an upper frequency limit;
F) determining and storing a second impedance of the capacitor for the second frequency;
G) determining a second phase angle from the second impedance; and
H) determining that the operating liquid located in the operating liquid container is partially in a solid and partially in a liquid aggregate state when the first phase angle is smaller than the first critical angle and a difference between the second phase angle and the first phase angle is greater than a second critical angle.

The correspondingly designed method has the advantage that determining or ascertaining whether the operating liquid stored in the operating liquid container is partially in a solid and partially in a liquid aggregate state is possible in a reliable manner without direct contact of the capacitor with the operating liquid. A state, in which the aqueous operating liquid stored in the operating liquid container is present partially in a liquid state and partially in a frozen state, is constituted particularly at temperatures in the range of the freezing mark of the operating liquid.

Preferably, a warning signal is output during method step H or following method step H. The warning signal is thus output when the operating liquid stored in the operating liquid container is present partially in a solid and partially in a liquid aggregate state.

By outputting a warning signal, a user of the motor vehicle, in which the operating liquid container is installed, can be informed that the operating liquid located in the interior of the operating liquid container is at least partially frozen. The outputting of the warning signal can particularly activate a heating device for heating the operating liquid stored in the operating liquid container.

Both the lower frequency limit and the upper frequency limit depend on the geometry and the dimensions of the capacitor and can thus vary. In particular, the lower frequency limit is 10 kHz and the upper frequency limit is 100 kHz.

The second critical angle is preferably 7°. When the aqueous operating liquid stored in the operating liquid container is partially in a solid and partially in a liquid aggregate state, the difference of the phase angle at the upper frequency limit which, for example, can have 100 kHz, and the phase angle at the lower frequency limit which, for example, can have 10 kHz, is more than 7°.

Preferably, more than only two alternating voltages are applied to the at least one capacitor. The multiplicity of the alternating voltages to be applied to the at least one capacitor each have different frequencies in a frequency range between the lower frequency limit and the upper frequency limit.

The frequency spacing of the alternating voltages, which are each adjacent to one another, are preferably variable and depend on the geometry and the dimensions of the capacitor and the measurement resolution to be achieved. The frequency spacing between the frequencies of the different alternating voltages is particularly 1 kHz.

Preferably, the method has the following method step:
I) Determining that the operating liquid located in the operating liquid container is in a liquid aggregate state when the first phase angle is smaller than the first critical angle and a difference between the second phase angle and the first phase angle is smaller than the second critical angle.

Preferably, a release signal is output during method step I or following method step I. The release signal is thus output when the operating liquid stored in the operating liquid container is present in the liquid aggregate state.

By outputting a release signal, it is possible to signal particularly a control device of the motor vehicle that the operating liquid located in the interior of the operating liquid container is present in the liquid aggregate state, thus enabling an operation of the motor vehicle.

Preferably, the method has the following method steps:
C') Determining a first capacitance of the capacitor from the first impedance;
G') determining a second capacitance of the capacitor from the second impedance;

L) determining a relative deviation of the second capacitance from the first capacitance; and D) determining that the operating liquid located in the operating liquid container is in a solid aggregate state when the relative deviation of the second capacitance from the first capacitance is greater than a first capacitance deviation.

The correspondingly designed method has an additionally increased accuracy and thus the reliability to detect ice formation of the operating liquid stored in the operating liquid container. This increases the operating safety of a motor vehicle in which an operating liquid container is installed which carries out the corresponding method.

The applicant has found that the capacitance of the capacitor decreases more strongly between a lower frequency limit and an upper frequency limit for an aqueous operating liquid in the solid aggregate state than for an aqueous operating liquid in the liquid aggregate state. In this case, the lower frequency limit and the upper frequency limit of the alternating voltage applied to the capacitor depend on the geometry of the capacitor and the size of the electrodes of the capacitor and the distance of the electrodes of the capacitor from one another and the measurement resolution to be achieved.

The applicant has found that the frequency-dependent capacitance of the capacitor for an aqueous operating liquid within the operating liquid container in a frequency range between 10 kHz and 100 kHz decreases by at least 20% when the aqueous operating liquid is in a solid aggregate state. Therefore, the first capacitance deviation is 20%.

However, the frequency range can change on the basis of the size and the geometry of the capacitor.

Preferably, the method has the following method step:

H) Determining that the operating liquid located in the operating liquid container is partially in a solid and partially in a liquid aggregate state when the relative deviation of the second capacitance from the first capacitance is smaller than the first capacitance deviation and greater than a second capacitance deviation.

The correspondingly designed method has an additionally increased accuracy and thus the reliability to detect ice formation of the operating liquid stored in the operating liquid container. This increases the operating safety of a motor vehicle, in which an operating liquid container is installed which carries out the corresponding method.

The applicant has found that the frequency-dependent capacitance of the capacitor for an aqueous operating liquid within the operating liquid container in a frequency range between 10 kHz and 100 kHz decreases by less than 20% and more than 5% when the aqueous operating liquid is partially in a solid and partially in a liquid aggregate state. Therefore, the first capacitance deviation is 20%, and the second capacitance deviation is 5%.

Preferably, the method has the following method step:

I) Determining that the operating liquid located in the operating liquid container is in a liquid aggregate state when the relative deviation of the second capacitance from the first capacitance is smaller than a second capacitance deviation.

The correspondingly designed method has an additionally increased accuracy and thus the reliability to determine a liquid aggregate state of the operating liquid stored in the operating liquid container. This increases the operating safety of a motor vehicle, in which an operating liquid container is installed which carries out the corresponding method.

The problem addressed by the present invention is further solved by a method according to claim 7 of the present invention. Advantageous embodiments of the method are described in the claims dependent on claim 7.

More precisely, the problem addressed by the present invention is solved by a method for determining an aggregate state of an operating liquid in an operating liquid container for a motor vehicle, wherein the operating liquid container has at least one capacitor which is fastened to a container wall of the operating liquid container and has a first electrode and a second electrode opposite said first electrode. The method according to the invention is characterized by the following method steps J, K, L, and M:

J) Applying at least two different alternating voltages to the capacitor, wherein a first frequency of a first alternating voltage corresponds to a lower frequency limit and a second frequency of a second alternating voltage corresponds to an upper frequency limit;

K) determining and storing a first capacitance of the capacitor for the first frequency and a second capacitance of the capacitor for the second frequency;

L) determining a relative deviation of the second capacitance from the first capacitance; and M) determining that the operating liquid located in the operating liquid container is in a solid aggregate state when the relative deviation of the second capacitance from the first capacitance is greater than a first capacitance deviation.

The method according to the invention is advantageous because determining or ascertaining whether the operating liquid stored in the operating liquid container is in a solid aggregate state and is thus present as ice, is possible in a reliable manner without direct contact of a measuring device, in the present case the capacitor, with the operating liquid. The capacitance of the at least one capacitor correlates with the aggregate state of the operating liquid stored in the operating liquid container. Therefore, by determining the frequency-dependent capacitance of the capacitor, the aggregate state of the operating liquid located in the operating liquid container can be deduced.

The aggregate state of the operating liquid stored in the operating liquid container correlates with the capacitance of the capacitor, which, in turn, depends on the medium penetrated by the alternating electric field between the first electrode and the second electrode of the capacitor. Therefore, by determining the frequency-dependent capacitance of the capacitor, the aggregate state of the operating liquid can be deduced.

The frequency-dependent capacitance of the capacitor depends on the electric conductivity of the medium penetrated by the alternating electric field between the first electrode and the second electrode of the capacitor. Therefore, the frequency-dependent capacitance of the capacitor depends on the material of the container wall and on the aggregate state of the operating liquid located in the interior of the operating liquid container. The applicant has found that the capacitance profile of the capacitor allows for clear inferences about the aggregate state of the operating liquid via the frequency of the applied alternating voltage. For example, the applicant has determined that the capacitance profile of the capacitor must show a specific deviation, for example, a specific drop between a lower frequency limit and an upper frequency limit when the operating liquid is in a solid aggregate state. In such case, the lower frequency limit and the upper frequency limit of the alternating voltage applied to the capacitor depend on the geometry of the capacitor and the size of the electrodes of the capacitor and the distance of the electrodes of the capacitor from one another.

The applicant has determined that the capacitance of the capacitor for an aqueous operating liquid stored within the operating liquid container with an electric conductivity of approximately 130 μS/cm in a frequency range between 10 kHz to 100 kHz deviates by at least 20%. Therefore, the difference between the capacitance of the capacitor at a frequency of 100 kHz and the capacitance of the capacitor at a frequency of 10 kHz is at least 20%. However, the frequency range can change on the basis of the size and the geometry of the capacitor.

The operating liquid container is preferably an operating liquid container for a motor vehicle. Further preferably, the operating liquid container is designed as a water container for a motor vehicle for receiving water which is provided for injection into an internal combustion engine of the motor vehicle. Further preferably, the operating liquid container is designed as a urea container for receiving an aqueous urea solution provided for injection into the exhaust gas system of an internal combustion engine.

In method step L for determining the relative deviation of the second capacitance from the first capacitance, the following calculation is carried out:

$$delta = |Cfmin - Cfmax| / Cfmin$$

in this case:
fmin is the lower frequency limit
fmax is the upper frequency limit
Cfmin is the first capacitance of the capacitor at an alternating voltage having the lower frequency limit
Cfmax is the second capacitance of the capacitor at an alternating voltage having the upper frequency limit
delta is the relative deviation of the second capacitance Cfmax from the first capacitance Cfmin The first minimum deviation is preferably more than 0.2.

For example, for tap water and a lower frequency limit of 10 kHz and an upper frequency limit of 100 kHz, the minimum deviation is, e.g., approximately 0.2 when the electrodes of the capacitor have a longitudinal extension of 100 mm, a width extension of 50 mm and a distance of the first electrode to the second electrode of 10 mm.

Preferably, a stop signal is output when the relative deviation of the second capacitance from the first capacitance is greater than a first capacitance deviation. By outputting the stop signal, an operation of the motor vehicle can be prevented.

Preferably, the method has the following method step:
N) Determining that the operating liquid located in the operating liquid container is partially in a solid and partially in a liquid aggregate state when the relative deviation of the second capacitance from the first capacitance is smaller than the first capacitance deviation and greater than a second capacitance deviation.

The correspondingly designed method has the advantage that determining or ascertaining whether the operating liquid stored in the operating liquid container is partially in a solid and partially in a liquid aggregate state is possible in a reliable manner without direct contact of the capacitor with the operating liquid. A state, in which the aqueous operating liquid stored in the operating liquid container is present partially in a liquid state and partially in a frozen state, is constituted particularly at temperatures in the range of the freezing mark of the operating liquid.

Preferably, a warning signal is output during method step N or following method step N. The warning signal is thus output when the operating liquid stored in the operating liquid container is present partially in a solid and partially in a liquid aggregate state.

By outputting a warning signal, a user of the motor vehicle, in which the operating liquid container is installed, can be informed that the operating liquid located in the interior of the operating liquid container is at least partially frozen and m partially present as ice. The outputting of the warning signal can particularly activate a heating device for heating the operating liquid stored in the operating liquid container.

Preferably, the method has the following method step:
O) Determining that the operating liquid located in the operating liquid container is in a liquid aggregate state when the relative deviation of the second capacitance from the first capacitance is smaller than a second capacitance deviation.

Preferably, a release signal is output during method step O or following method step O. The release signal is thus output when the operating liquid stored in the operating liquid container is present in the liquid aggregate state.

By outputting a release signal, it is possible to signal particularly a control device of the motor vehicle that the operating liquid located in the interior of the operating liquid container is present in the liquid aggregate state, thus enabling an operation of the motor vehicle.

Furthermore, the problem addressed by the present invention is that of providing an operating liquid container designed to determine an aggregate state of an operating liquid located in said operating liquid container.

This problem is solved by an operating liquid container with the features of claim 10. Advantageous embodiments of the operating liquid container are described in the claims dependent on claim 10.

More precisely, the problem addressed by the present invention is solved by an operating liquid container, the interior of said operating liquid container being delimited by a ceiling wall, a bottom wall, and a sidewall which connects the bottom wall to the ceiling wall. The operating liquid container has at least one capacitor fastened to a container wall of the operating liquid container with a first electrode and a second electrode. The operating liquid container further has an electronic evaluator which is electrically connected to the first electrode and to the second electrode. The operating liquid container according to the invention is characterized in that the evaluator is designed to carry out at least one of the methods described above.

The at least one capacitor is preferably attached to or in a sidewall of the operating liquid container. Further preferably, the at least one capacitor is arranged on the sidewall or in the sidewall such that the first electrode and the second electrode, which each have a longitudinal extension, a width extension, and a depth extension, each run parallel to the sidewall such that the longitudinal extensions of the first electrode and the second electrode run from the bottom wall in the direction of the ceiling wall.

According to a further embodiment of the operating liquid container, the at least one capacitor is arranged on the bottom wall or in the bottom wall, so that the first electrode and the second electrode each run parallel to the bottom wall.

The at least one capacitor can be arranged on and connected to an outer face of the container wall. Furthermore, it is also possible that the at least one capacitor is integrated or embedded in the container wall. In such case, the respective first and second electrodes of the capacitor are enclosed by the container wall.

The operating liquid container is preferably designed such that the at least one capacitor is embedded in the container wall.

If the electrodes of the capacitor are embedded in the container wall, the electrodes are enclosed by the container wall, so that only electrical connections of the electrodes protrude from the container wall.

The correspondingly designed operating liquid container has the advantage that, due to the embedding of the at least one capacitor in the container wall of the operating liquid container, the first electrode and the second electrode of the at least one capacitor have a decreased distance to the interior of the operating liquid container and thus to the operating liquid located in the interior of the operating liquid container. Therefore, an electric field located between the first electrode and the second electrode of the capacitor interacts less with the material of the container wall and more with the operating liquid located in the interior of the operating liquid container. As a result, the aggregate state of the operating liquid in the interior of the operating liquid container can be determined with increased accuracy.

A further advantage of embedding the at least one capacitor in the container wall is that the at least one capacitor is mechanically and chemically protected, so that the operating liquid container according to the invention has an increased long-term stability.

The operating liquid container is designed particularly as an operating liquid container for a motor vehicle.

The operating liquid container is preferably designed such that the bottom wall has an elevation extending into the interior of the operating liquid container, wherein the first electrode and the second electrode of the capacitor are embedded in the elevation.

Due to a corresponding design of the operating liquid container, the determination of the aggregate state of the operating liquid is made possible with additionally increased accuracy because possible deposits in the area of the bottom wall have a reduced influence on determining the aggregate state of the operating liquid located in the interior of the operating liquid container.

The elevation in the bottom wall is preferably designed as a turned-in portion in the interior of the operating liquid container.

The elevation is raised preferably between 2 mm and 5 mm from the surrounding inner surface of the bottom wall.

Preferably, the operating liquid container is designed such that the container wall comprises an outer layer, an inner layer facing the interior of the operating liquid container, and a bonding layer arranged in between, wherein the first electrode and the second electrode of the at least one capacitor are arranged between the outer layer and the bonding layer.

Therefore, the at least one capacitor is arranged between the outer layer and the bonding layer. The inner layer can thus be brought into contact with the operating liquid.

A corresponding design of the operating liquid container allows for a simplified structure and a simplified integration of the capacitor in the container wall of the operating liquid container.

Preferably, the operating liquid container is designed such that the container wall has a shielding layer and an insulating layer, wherein the shielding layer is arranged between the outer layer and the first and second electrodes, and wherein the insulating layer is arranged between the shielding layer and the first and second electrodes.

The correspondingly designed operating liquid container has the advantage that it has an additionally increased accuracy with regard to the determination of the aggregate state of the operating liquid located in the interior of the operating liquid container because the shielding layer, preferably designed as a metal layer, shields the electrodes of the at least one capacitor from interfering fields.

The shielding layer is thus arranged between the outer layer and the reference capacitor or capacitor.

The shielding layer is preferably in contact with the outer layer.

Therefore, the insulating layer is arranged in a sandwich-like manner between the shielding layer and the capacitor.

The shielding layer comprises a metal, so that the at least one capacitor is protected from electrical interfering fields.

The insulating layer is made from a dielectric material, preferably a plastic, so that the first and second electrodes of the at least one capacitor are not in electrical contact with the shielding layer.

Preferably, the operating liquid container is designed such that the insulating layer has the same dielectric conductivity as the inner layer and/or the outer layer.

The correspondingly designed operating liquid container has the advantage that it has an additionally increased accuracy with regard to the determination of the aggregate state of the operating liquid located in the interior of the operating liquid container.

Preferably, the operating liquid container is designed such that a distance of the first and the second electrode to the interior of the operating liquid container is between 1.5 mm and 3.5 mm.

The correspondingly designed operating liquid container has the advantage that it has an additionally increased accuracy with regard to the determination of the aggregate state of the operating liquid located in the interior of the operating liquid container because the distance of the respective electrodes to the operating liquid located in the interior of the operating liquid container is reduced.

Preferably, the inner layer thus has a thickness from 1.5 mm to 3.5 mm.

Therefore, the distance between the least one capacitor and the interior of the operating liquid container is only 1.5 mm to 3.5 mm.

Preferably, the operating liquid container is designed such that at least one of the first and second electrodes of the capacitor has an uneven width extension along its longitudinal extension.

The wider the electrodes, the deeper the electric field penetrates the interior of the operating liquid container and the operating liquid located therein, so that the operating liquid has a greater influence on the determination of the aggregate state of the operating liquid.

Preferably, the operating liquid container is designed such that at least one of the first and second electrodes of the capacitor has a width extension which increases along its longitudinal extension in the direction of the bottom wall.

The correspondingly designed operating liquid container has the advantage that the measurement accuracy of the aggregate state is increased by means of the capacitor in the bottom area of the operating liquid container.

Figure 2:
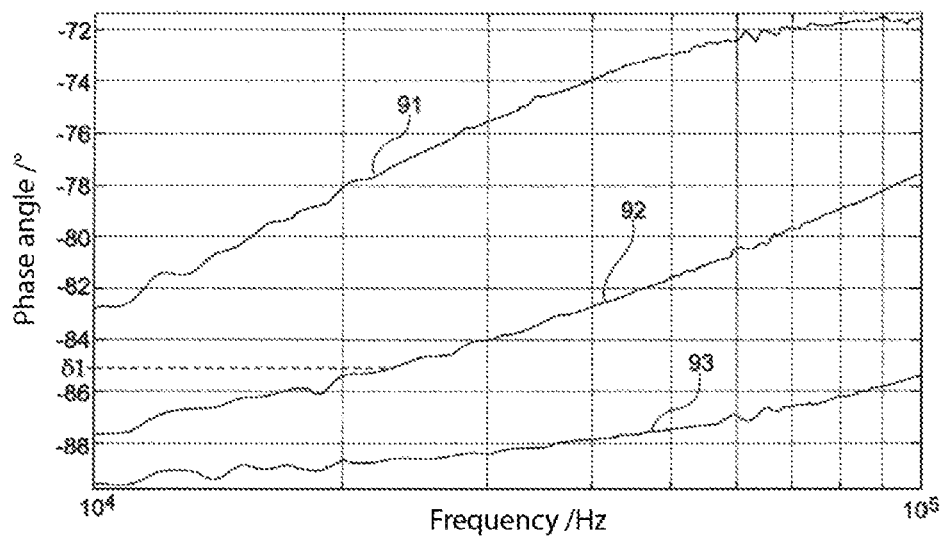
Figure 3:
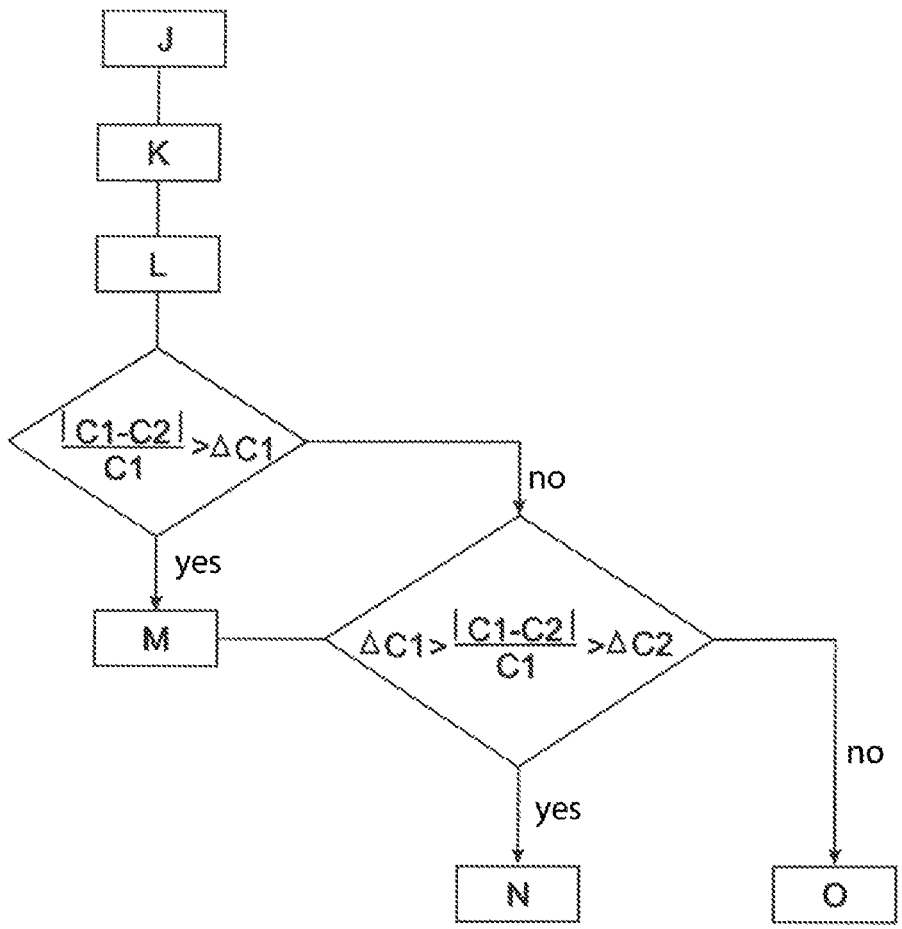
Figure 4:
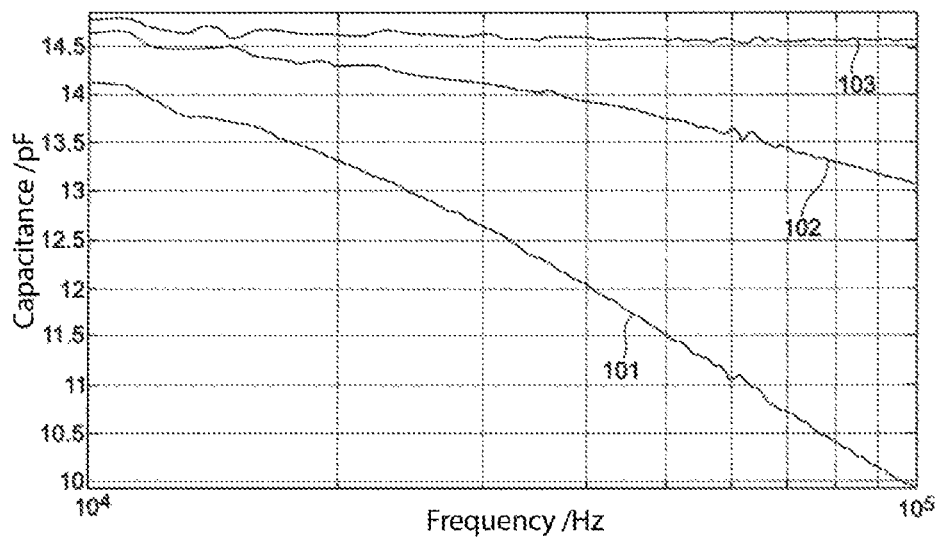
Figure 5:
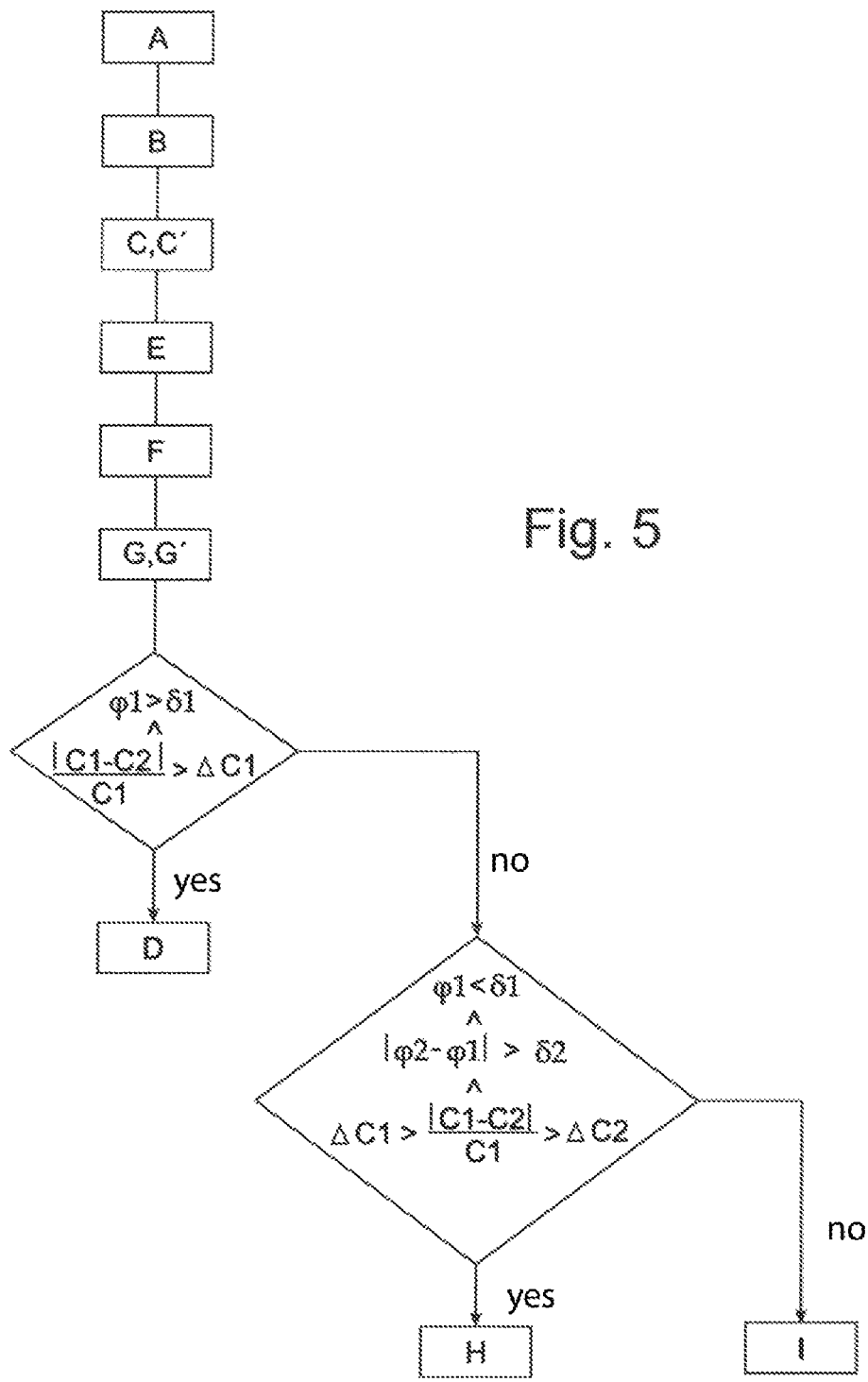
Figure 6:
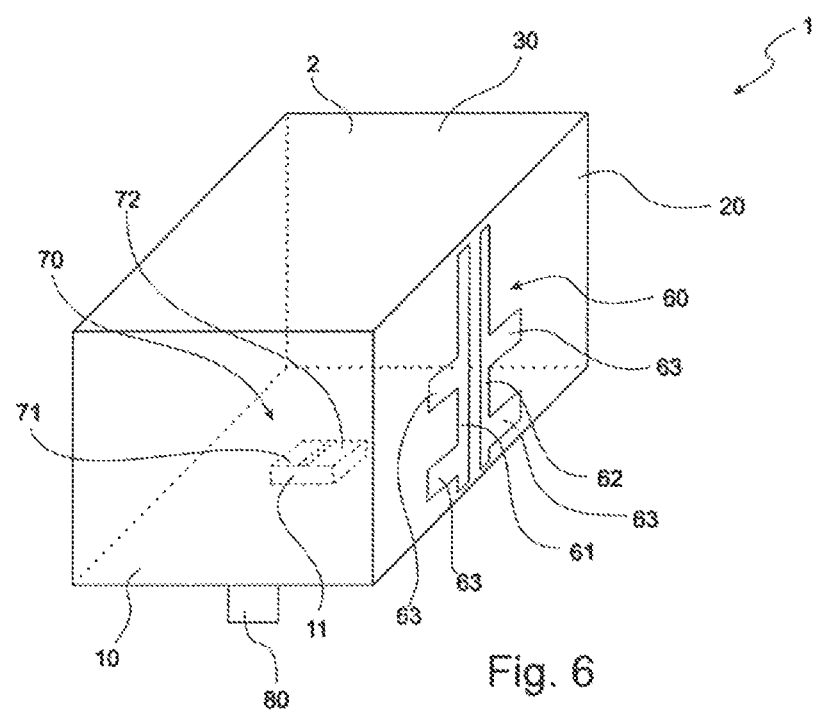
Figure 7:
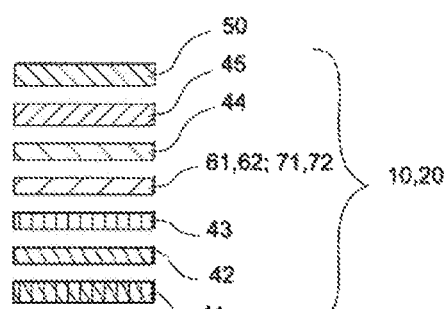

In the following, further advantages, details, and features of the invention shall become apparent from the described embodiments. The drawings show in detail in:

FIG. 1: A flow chart of a method for determining an aggregate state of an aqueous operating liquid according to a first embodiment of the present invention;

FIG. 2: Frequency-dependent phase profiles of the impedance of a capacitor for an aqueous operating liquid with three different temperatures;

FIG. 3: A flow chart of a method for determining an aggregate state of an aqueous operating liquid according to a second embodiment of the present invention;

FIG. 4: Frequency-dependent capacitance profiles of a capacitor for an aqueous operating liquid with three different temperatures;

FIG. 5: A flow chart of a method for determining an aggregate state of an aqueous operating liquid according to a third embodiment of the present invention;

FIG. 6: A greatly simplified spatial depiction of an operating liquid container according to the invention;

FIG. 7: A greatly simplified depiction of a layer structure of the bottom wall and/or the sidewall of the operating liquid container according to a further embodiment of the present invention; and FIGS. 8A to 8C: A lateral top view of examples of capacitors in isolation of operating liquid containers with different embodiments of the present invention.

In the following description, the same reference signs denote the same components or the same features, and so a description regarding a component with reference to a drawing also applies to the other drawings, so that a repetitious description is avoided. In addition, individual features described in connection with an embodiment can also be used separately in other embodiments.

FIG. 1 shows a flow chart of a method for determining an aggregate state of an aqueous operating liquid in an operating liquid container 1 according to a first embodiment of the present invention. The method according to the flow chart shown in FIG. 1 is carried out by an operating liquid container 1 shown in FIG. 6.

FIG. 6 shows a greatly simplified spatial depiction of an operating liquid container 1 according to the invention. An interior 2 of the operating liquid container is delimited by a ceiling wall 30, a bottom wall 10, and a sidewall 20 which connects the bottom wall 10 to the ceiling wall 30. FIG. 6 shows that the sidewall 20 is designed so as to be continuous.

The operating liquid container 1 shown in FIG. 6 has a first capacitor 60 and a second capacitor 70. However, according to the present invention, the operating liquid container 1 can also only have the first capacitor 60 or only the second capacitor 70. Furthermore, the operating liquid container 1 can also have further capacitors which are not shown in FIG. 6.

The first capacitor 60 has a first electrode 61 and a second electrode 62. Both the first electrode 61 and the second electrode 62 each have a longitudinal extension L, a width extension B, and a depth extension (see FIGS. 8A to 8C). In this case, the first electrode 61 and the second electrode 62 are each arranged parallel to the sidewall 20 such that the longitudinal extensions L of the first electrode 61 and the second electrode 62 run from the bottom wall 10 in the direction of the ceiling wall 30. In this case, the depth extensions of the first electrode 61 and the second electrode 62 are arranged opposite of one another.

The first capacitor 60 is embedded in the sidewall 20, so that the first electrode 61 and the second electrode 62 of the first capacitor 60 are embedded in the sidewall 20. The first capacitor 60 is thus enclosed by the sidewall 20. Consequently, the first electrode 61 and the second electrode 62 of the first capacitor 60 are not in direct contact with an operating liquid 50 (see FIG. 7). In addition, the first electrode 61 and the second electrode 62 of the first capacitor 60 are also not in direct contact with the surroundings of the operating liquid container 1. With regard to the embedding of the first capacitor 60 in the sidewall 20, reference is made to FIG. 6 which will be described below.

However, the present invention is not limited to the first capacitor 60 being embedded in the sidewall 20. In an operating liquid container 1 according to the invention, the first capacitor 60 can also be fastened to an exterior surface of the sidewall 20.

FIG. 6 shows that the first electrode 61 and the second electrode 62 of the first capacitor 60 each have two wings 63 which run parallel to the width extension B of the electrodes 61, 62. In this case, the respective wings 63 are designed to be at different heights of the first and second electrodes 61, 62, so that the wings 63 are arranged at different heights of the operating liquid container 1. Therefore, the first and second electrodes 61, 62 of the first capacitor 60 have an uneven width extension B along their longitudinal extension L. However, the present invention is not limited to a corresponding design of the first and second electrodes 61, 62 of the first capacitor 60. For example, the first and second electrodes 61, 62 of the first capacitor 60 can also have an even width extension B along their longitudinal extensions L.

The second capacitor 70 has a first electrode 71 and a second electrode 72. The first electrode 71 and the second electrode 72 run parallel to the bottom wall 10. In this case, the first electrode 71 and the second electrode 72 are each arranged parallel to the bottom wall 10 such that the longitudinal extensions and the width extensions of the first electrode 71 and the second electrode 72 run in the plane of the bottom wall 10, so that the depth extensions of the first electrode 71 and the second electrode 72 are arranged opposite of one another.

As can be seen in FIG. 6, the bottom wall 10 has an elevation 11 which extends into the interior 2 of the operating liquid container. The second capacitor 70 is embedded in the bottom wall 10 such that the first electrode 71 and the second electrode 72 of the second capacitor 70 are embedded in the elevation 11 of the bottom wall 10. As a result, the first electrode 71 and the second electrode 72 of the second capacitor 70 are not in direct contact with the operating liquid 50. In addition, the first electrode 71 and the second electrode 72 of the second capacitor 70 are also not in direct contact with the surroundings of the operating liquid container 1. Due to the embedding of the first electrode 71 and the second electrode 72 in the elevation 11 of the bottom wall 10, possible deposits on the bottom wall 10 have a diminished effect on determining the aggregate state of the operating liquid 50 located in the interior 2 of the operating liquid container.

With regard to embedding the second capacitor 70 in the bottom wall 10 or in the elevation 11 in the bottom wall 10, reference is made to FIG. 7 which will be described below.

However, the present invention is not limited to the second capacitor 70 being embedded in the bottom wall 10. In an operating liquid container 1 according to the invention, the second capacitor 70 can also be fastened to an exterior surface of the bottom wall 10.

The operating liquid container 1 further has an electronic evaluator 80 which is electrically connected to the first capacitor 60 and the second capacitor 70. The evaluator 80 is connected to the first capacitor 60 and the second capacitor 70 via electric lines not depicted in FIG. 6.

The evaluator 80 is designed to carry out the method according to the flow chart shown in FIG. 1, which shall be described in the following.

In a method step A, at least one first alternating voltage is applied to the first capacitor 60 and/or to the second capacitor 70. In this case, a first frequency corresponds to the first alternating voltage of a lower frequency limit fmin which, in the depicted embodiment, is 10 kHz.

In a method step B, the first impedance of the first capacitor 60 and/or the second capacitor 70 is determined and stored for the first frequency.

In a method step C, a first phase angle φ1 is subsequently determined from the first impedance.

FIG. 2 shows three different frequency-dependent phase profiles of impedances of the first capacitor 60 and/or the second capacitor 70 for an aqueous operating liquid 50 with three different temperatures. In this case, the profile 91 shows a phase profile of the impedance for the aqueous operating liquid which has a temperature of −15° C. The profile 92 shows the frequency-dependent profile of the phase angle of the impedance for the operating liquid which has a temperature of −2° C. The profile 93 shows the frequency-dependent profile of the phase angle of the impedance for the operating liquid which has a temperature of +3° C.

From the profile 91 of the phase angle of the impedance of the capacitor 60, 70 for the operating liquid with a temperature of −15° C. as shown in FIG. 2, it can be seen that the first phase angle φ1 at a lower frequency limit fmin of 10 kHz is greater than a first critical angle δ1 plotted in FIG. 2, wherein, in the depicted embodiment, the first critical angle δ1 is −85°.

Returning to the method according to the flow chart shown in FIG. 1, it is verified after method step C whether the first phase angle φ1 is greater than the first critical angle δ1. If this requirement is met, it is determined in a method step D that the operating liquid 50 located in the operating liquid container 1 is in a solid aggregate state and is thus present as ice. From the profile 91 of the phase angle of the impedance of the capacitor 60, 70 for the operating liquid with a temperature of −15° C., the first phase φ1 is approximately −83°. However, the first critical angle δ1 is −85°. Therefore, the requirement that the first phase angle φ1 is greater than the first critical angle δ1 is met for the operating liquid with a temperature of −15 ° C., so that, in a method step D, it is determined that the operating liquid is in a solid aggregate state.

If the first phase angle φ1 is not greater that the first critical angle δ1, a second alternating voltage is applied in a method step E to the first capacitor 60 and/or to the second capacitor 70, wherein a second frequency of the second alternating voltage corresponds to an upper frequency limit fmax. In the depicted embodiment, the upper frequency limit is 100 kHz. In a method step F, a second impedance of the first capacitor 60 and/or the second capacitor 70 is subsequently determined and stored for the second frequency. Following method step F, a second phase angle φ2 is determined from the second impedance in a method step G.

It is subsequently verified whether an absolute value of a difference between the second phase angle φ2 and the first phase angle φ1 is greater that a second critical angle δ2. If this requirement is met, it is determined in a method step H that the operating liquid 50 located in the operating liquid container 1 is partially in a solid and partially in a liquid aggregate state. Therefore, method step H is only carried out if the first phase angle φ1 is smaller than the first critical angle δ1, and an absolute value of a difference between the second phase angle φ2 and the first phase angle φ1 is greater than the second critical angle δ2.

From the profile 92 of the phase angle of the impedance of the capacitor 60, 70 for the operating liquid with a temperature of −2° C. as shown in FIG. 2, it can be seen that the first phase angle φ1 at the lower frequency limit fmin of 10 kHz is approximately −87, 5°, and the second phase angle φ2 at the upper frequency limit fmax of 100 kHz is approximately −77, 5°. The absolute value of the difference between the second phase angle φ2 and the first phase angle φ1 is thus 10°. In the depicted embodiment, the second critical angle δ2 is 7°. Since the first phase angle φ1 is smaller than the first critical angle δ1 and the absolute value of the difference between the second phase angle φ2 and the first phase angle φ1 is greater than 7°, it is determined in method step H for the profile of the phase angle shown in FIG. 2 that the operating liquid located in the operating liquid container 1 is partially in a solid and partially in a liquid aggregate state and thus partially frozen.

Alternatively, method steps E, F, and G can also be carried out directly following method step C.

If the absolute value of the difference between the second phase angle φ2 and the first phase angle φ1 is smaller than the critical angle δ2, it is determined in a method step I that the operating liquid 50 located in the operating liquid container 1 is in a liquid aggregate state.

From the profile 93 of the phase angle of the impedance of the capacitor 60, 70 for the operating liquid with a temperature of +3° C. as shown in FIG. 2, it can be seen that the first phase angle φ1 at the lower frequency limit fmin of 10 kHz is approximately 31 90°, and the second phase angle φ2 at the upper frequency limit fmax of 100 kHz is approximately −85, 5°. The absolute value of the difference between the second phase angle φ2 and the first phase angle φ1 is thus 4, 5°. In the depicted embodiment, the second critical angle δ2 is 7°. Since the first phase angle φ1 is smaller than the first critical angle δ1 and the absolute value of the difference between the second phase angle φ2 and the first phase angle φ1 is smaller than 7°, it is determined in method step I for the profile 93 of the phase angle shown in FIG. 2 that the operating liquid located in the operating liquid container 1 is in a liquid aggregate state.

The evaluator 80 of the operating liquid container 1 shown in FIG. 6 is further designed to carry out the method according to the flow chart shown in FIG. 3 which shall be described in the following.

In a method step J, at least two different alternating voltages with different frequencies are applied to the first capacitor 60 and/or to the second capacitor 70. In this case, a first frequency corresponds to a first alternating voltage of a lower frequency limit fmin. A second frequency corresponds to a second alternating voltage of an upper frequency limit fmax.

In a method step K, a first capacitance C1 of the first capacitor and/or the second capacitor 70 is subsequently determined and stored for the first frequency. In addition, a second capacitance C2 of the first capacitor 60 and/or the second capacitor 70 is determined and stored for the second frequency in method step K.

In a method step L, a relative deviation of the second capacitance C2 from the first capacitance C1 is subsequently determined. In method step L, it is thus determined by how many percentages the second capacitance C2 deviates from the first capacitance C1.

FIG. 4 shows three different frequency-dependent capacitance profiles of the first capacitor 60 and/or the second capacitor for an aqueous operating liquid 50 with three different temperatures. In this case, the profile 101 shows a frequency-dependent capacitance profile of the first capacitor 60 and/or the second capacitor 70 for the aqueous operating liquid with a temperature of −15° C. The profile 102 shows the frequency-dependent capacitance profile of the first capacitor 60 and/or the second capacitor 70 for the operating liquid with a temperature of −2° C. The profile 103 shows the frequency-dependent capacitance profile of the first capacitor 60 and/or the second capacitor 70 for the operating liquid with a temperature of +3° C.

It can be seen in FIG. 4 that the profile 101 of the frequency-dependent capacitance of the capacitor 60, 70 for the aqueous operating liquid 50 with a temperature of −15° C. drops from a first capacitance C1 to a second capacitance C2. In this case, the capacitor 60, 70 at the lower frequency limit fmin, which, in the depicted embodiment, is 10 kHz, has the first capacitance C1 of approximately 14 pF, and at the upper frequency limit fmax, which, in the depicted embodiment, is 100 kHz, it has the second capacitance C2 of approximately 10 pF. Therefore, the relative deviation from C1 to C2 at the operating liquid with a temperature of −15° C. is approximately 28%.

It can further be seen in FIG. 4 that the frequency-dependent capacitance of the capacitor 60, 70 for the aqueous operating liquid 50 with a temperature of −2° C. drops from a first capacitance C1 to a second capacitance C2. In this case, the capacitor 60, 70 at the lower frequency limit fmin has the first capacitance C1 of approximately 14.5 pF, and at the upper frequency limit fmax, it has the second capacitance C2 of approximately 13 pF. Therefore, the relative deviation from C1 to C2 at the operating liquid with a temperature of −2° C. is approximately 10%.

It can further be seen in FIG. 4 that the frequency-dependent capacitance of the capacitor 60, 70 for the aqueous operating liquid 50 with a temperature of +3° C. drops from a first capacitance C1 to a second capacitance C2. In this case, the capacitor 60, 70 at the lower frequency limit fmin has the first capacitance C1 of approximately 15 pF, and at the upper frequency limit fmax, it has the second capacitance C2 of approximately 14.6 pF. Therefore, the relative deviation from C1 to C2 at the operating liquid with a temperature of +3° C. is approximately 2.6%.

Returning to the method according to the flow chart shown in FIG. 3, it is verified after method step L whether the relative deviation of the second capacitance C2 from the first capacitance C1 is greater than a first capacitance deviation ΔC1. More precisely, it is determined whether the following requirement is met:

$$\frac{|C1 - C2|}{C1} > \Delta C1$$

If this requirement is met, it is determined in a method step M that the operating liquid located in the operating liquid container 1 is in a solid aggregate state.

In the described embodiment, the first capacitance deviation ΔC1 has a value of 0.2. For the capacitance profile 101 shown in FIG. 4, it is thus determined that the operating liquid located in the operating liquid container 1 is in a solid aggregate state because the relative deviation of the second capacitance C2 from the first capacitance C1 is 28% and thus 0.28.

However, if the requirement $$\frac{|C1 - C2|}{C1} > \Delta C1$$

is not met, it is verified whether the following requirement is met:

$$\Delta C1 > \frac{|C1 - C2|}{C1} > \Delta C2$$

In this case, ΔC2 is a second capacitance deviation which, in the present embodiment, is 0.05. If this requirement is met, it is determined in a method step N that the operating liquid located in the interior 2 of the operating liquid container is partially in a solid and partially in a liquid aggregate state. Method step N is thus carried out when the relative deviation of the second capacitance C2 from the first capacitance C1 has a value between the first capacitance deviation ΔC1 and the second capacitance deviation ΔC2, wherein the second capacitance deviation ΔC2 is smaller than the first capacitance deviation ΔC1.

For the capacitance profile 102 shown in FIG. 4, it is thus determined in method step N that the operating liquid located in the operating liquid container 1 is partially in a solid and partially in a liquid aggregate state because the relative deviation of the second capacitance C2 from the first capacitance C1 is 0.1, and the requirement 0.20>0.10>0.05 is thus met.

However, if the requirement $$\Delta C1 > \frac{|C1 - C2|}{C1} > \Delta C2$$

is not met, it is determined in a method step O that the operating liquid located in the operating liquid container 1 is in a liquid aggregate state.

The evaluator 80 of the operating liquid container 1 shown in FIG. 6 is further designed to carry out the method according to the flow chart shown in FIG. 5 which shall be described in the following. In this case, the method according to the flow chart shown in FIG. 5 is a result of a combination of the method according to the flow chart shown in FIG. 1 and the method according to the flow chart shown in FIG. 3.

In a method step A, at least one first alternating voltage is applied to the first capacitor 60 and/or to the second capacitor 70. In this case, a first frequency corresponds to the first alternating voltage of a lower frequency limit fmin which, in the depicted embodiment, is 10 kHz.

In a method step B, the first impedance of the first capacitor 60 and/or the second capacitor 70 is determined and stored for the first frequency.

In a method step C, a first phase angle φ1 is subsequently determined from the first impedance. In a method step C', a first capacitance C1 of the first capacitor 60 and/or the second capacitor 70 is determined and stored for the first frequency.

In a method step E, a second alternating voltage is subsequently applied to the first capacitor 60 and/or to the second capacitor 70, wherein a second frequency of the second alternating voltage corresponds to an upper frequency limit fmax. In the depicted embodiment, the upper frequency limit is 100 kHz. In a method step F, a second impedance of the first capacitor 60 and/or the second capacitor 70 is subsequently determined and stored for the second frequency. Following method step F, a second phase angle φ2 is determined from the second impedance in a method step G. In a method step G', a second capacitance C2 of the first capacitor 60 and/or to the second capacitor 70 is determined and stored for the second frequency.

Following method step G, it is verified whether the first phase angle φ1 is greater than the first critical angle δ1, and whether the relative deviation of the second capacitance C2 from the first capacitance C1 is greater than a first capacitance deviation ΔC1. If these requirements are met, it is determined in a method step D that the operating liquid 50 located in the operating liquid container 1 is in a solid aggregate state and thus present as ice.

However, if these requirements are not met, it is verified whether the first phase angle φ1 is smaller than the first critical angle δ1, whether an absolute value of a difference between the second phase angle φ2 and the first phase angle φ1 is greater than a second critical angle δ2, and whether the relative deviation of the second capacitance C2 from the first capacitance C1 is smaller than the first capacitance deviation ΔC1 and greater than the second capacitance deviation ΔC2.

If these requirements are met, it is determined in a method step H that the operating liquid 50 located in the operating liquid container 1 is partially in a solid and partially in a liquid aggregate state. However, if these requirements are not met, it is determined in a method step I that the operating liquid located in the operating liquid container 1 is in a liquid aggregate state.

FIG. 7 shows a greatly simplified depiction of a layer structure of a container wall 10, 20, 30 of the operating liquid container 1. The container wall can be the bottom wall 10 and/or the sidewall 20 and/or the ceiling wall 30. It can be seen that the container wall 10 has a multilayered structure.

In the following, the layer structure of the container wall 10, 20, 30 shall be described with reference to the bottom wall 10 and with reference to the second capacitor 70. However, the sidewall 20 and/or the ceiling wall 30 can also have a corresponding layer structure. In addition, the first capacitor 60 can also be embedded in the same manner in the container wall 10, 20, 30.

It can be seen that the bottom wall 10 comprises an outer layer 41, an inner layer 45 facing the interior 2 of the operating liquid container, and a bonding layer 44 arranged between the outer layer 41 and the inner layer 45. The first electrode 71 and the second electrode 72 of the second capacitor 70 are arranged between the outer layer 41 and the bonding layer 44. The bottom wall 10 furthermore has a shielding layer 42 and an insulating layer 43, wherein the shielding layer 42 is arranged between the outer layer 41 and the first electrode 71 and the second electrode 72 of the second capacitor 70. In turn, the insulating layer 43 is arranged between the shielding layer 42 and the first and second electrode 71, 72 of the second capacitor 70.

It can also be seen that the bottom wall 10 comprises an outer layer 41, an inner layer 45 facing the interior 2 of the operating liquid container, and a bonding layer 44 arranged between the outer layer 41 and the inner layer 45. The first electrode 71 and the second electrode 72 of the second capacitor 70 are arranged between the outer layer 41 and the bonding layer 44. The bottom wall 10 furthermore has a shielding layer 42 and an insulating layer 43, wherein the shielding layer 42 is arranged between the outer layer 41 and the first and second electrodes 71, 72 of the second capacitor 70. In turn, the insulating layer 43 is arranged between the shielding layer 42 and the first and second electrodes 71, 72 of the second capacitor 70.

Figure 8A:
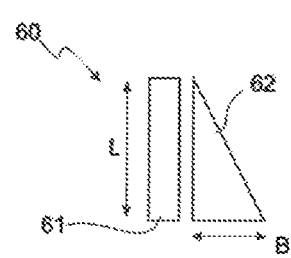

FIG. 8A shows a lateral top view of a first capacitor 60 in isolation. In the depicted embodiment, it can be seen that the first electrode 61 of the first capacitor 60 has an even width extension B along its longitudinal extension L. By contrast, the second electrode 62 of the first capacitor 60 has a width extension B which is altered along the longitudinal extension of the second electrode 62. It can be seen that the width of the second electrode 62 has an increasing width extension B along its longitudinal extension L in the direction of the bottom wall 10.

Figure 8B:
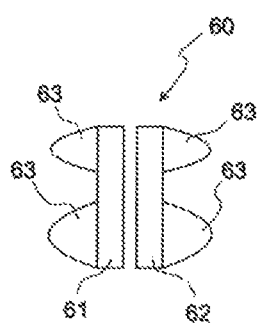

FIG. 8B shows a further example of a first capacitor 60 according to a further embodiment of the operating liquid container 1. It can be seen that both the first electrode 61 and the second electrode 62 each have two wings 63 at different heights, i.e., in different positions with regard to the longitudinal extension L of the first and second electrodes 61, 62, said wings extending along the width extension B of the first and second electrodes 61, 62. It can be seen that the respective wings 63 are rounded.

Figure 8C:
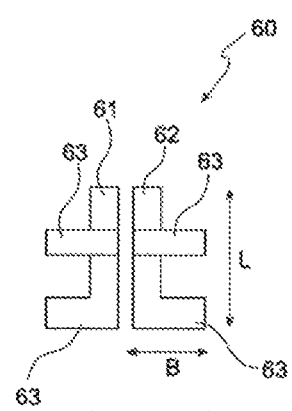

FIG. 8C also shows a first capacitor 60 of an operating liquid container 1 according to a further embodiment. The first capacitor 60 shown in FIG. 8C is also designed such that both the first electrode 61 and the second electrode 62 each have two wings 63 which extend in the width extension B of the corresponding electrodes 61, 62. In this case, the respective wings 63 are arranged at different heights of the corresponding electrodes 61, 62.

However, the present invention is not limited to the embodiments of the first capacitor 60 shown FIGS. 8A to 8C, as long as an electric field is generated by the first capacitor 60, which extends into the interior 2 of the operating liquid container, so that the aggregate state of an aqueous operating liquid 50 can be determined by means of the evaluator 80.

LIST OF REFERENCE SIGNS

1 Operating liquid container
2 Interior of the operating liquid container
10 Bottom wall (of the operating liquid container)
11 Elevation (of the bottom wall)
20 Sidewall (of the operating liquid container)
30 Ceiling wall
41 Outer layer (of the bottom wall/the sidewall)
42 Shielding layer (of the bottom wall/the sidewall)
43 Insulating layer (of the bottom wall/the sidewall)
44 Bonding layer (of the bottom wall/the sidewall)
45 Inner layer (of the bottom wall/the sidewall)
50 Operating liquid
60 first capacitor
61 first electrode (of the first capacitor)
62 second electrode (of the first capacitor)
63 Wings (of the first electrode and/or the second electrode)
70 second capacitor
71 first electrode (of the second capacitor)
72 second electrode (of the second capacitor)
80 Evaluator
91 frequency-dependent phase profile for an aqueous operating liquid with a temperature of −15° C.
92 frequency-dependent phase profile for an aqueous operating liquid with a temperature of −2° C.
93 frequency-dependent phase profile for an aqueous operating liquid with a temperature of +3° C.
101 frequency-dependent capacitance profile for an aqueous operating liquid with a temperature of −15° C.
102 frequency-dependent capacitance profile for an aqueous operating liquid with a temperature of −2° C.
103 frequency-dependent capacitance profile for an aqueous operating liquid with a temperature of +3° C.
L Longitudinal extension (of the electrodes of the measuring capacitor)

B Width extension (of the electrodes of the measuring capacitor)
C1 first capacitance (of the capacitor)
C2 second capacitance (of the capacitor)
fmin lower frequency limit
fmax upper frequency limit
φ1 first phase angle
φ2 second phase angle
δ1 first critical angle
δ2 second critical angle
ΔC1 first capacitance deviation
ΔC2 second capacitance deviation

The invention claimed is:

1. A method for determining an aggregate state of an aqueous operating liquid in an operating liquid container for a motor vehicle, wherein the operating liquid container has at least one capacitor which is fastened to a container wall of the operating liquid container and has a first electrode and a second electrode opposite said first electrode, the method comprising:
applying at least a first alternating voltage to the capacitor, wherein a first frequency of the first alternating voltage corresponds to a lower frequency limit (fmin);
determining and storing a first impedance of the capacitor for the first frequency;
determining a first phase angle (φ1) from the first impedance;
determining that the operating liquid located in the operating liquid container is in a solid aggregate state when the first phase angle (φ1) is greater than a first critical angle (δ1);
applying a second alternating voltage to the capacitor, wherein a second frequency of the second alternating voltage corresponds to an upper frequency limit (fmax);
determining and storing a second impedance of the capacitor for the second frequency;
determining a second phase angle (φ2) from the second impedance; and
determining that the operating liquid located in the operating liquid container is partially in a solid and partially in a liquid aggregate state when the first phase angle (φ1) is smaller than the first critical angle (δ1) and a difference between the second phase angle (φ2) and the first phase angle (φ1) is greater than a second critical angle (δ2).

2. The method according to claim 1, further comprising:
determining that the operating liquid located in the operating liquid container is in a liquid aggregate state when the first phase angle (φ1) is smaller than the first critical angle (δ1) and a difference between the second phase angle (φ2) and the first phase angle (φ1) is smaller than the second critical angle (δ2).

3. The method according to claim 2, further comprising:
determining a first capacitance (C1) of the capacitor from the first impedance;
determining a second capacitance (C2) of the capacitor from the second impedance;
determining a relative deviation of the second capacitance (C2) from the first capacitance (C1); and
determining that the operating liquid located in the operating liquid container is in a solid aggregate state when the relative deviation of the second capacitance (C2) from the first capacitance (C1) is greater than a first capacitance deviation (ΔC1).

4. The method according to claim 3, further comprising:
determining that the operating liquid located in the operating liquid container is partially in a solid and partially in a liquid aggregate state when the relative deviation of the second capacitance (C2) from the first capacitance (C1) is smaller than the first capacitance deviation (ΔC1) and greater than a second capacitance deviation (ΔC2).

5. The method according to claim 4, further comprising:
determining that the operating liquid located in the operating liquid container is in a liquid aggregate state when the relative deviation of the second capacitance (C2) from the first capacitance (C1) is smaller than a second capacitance deviation (ΔC2).

6. A method for determining an aggregate state of an aqueous operating liquid in an operating liquid container for a motor vehicle, wherein the operating liquid container has at least one capacitor which is fastened to a container wall of the operating liquid container and has a first electrode and a second electrode opposite said first electrode, the method comprising:
applying at least two different alternating voltages to the capacitor, wherein a first frequency of a first alternating voltage corresponds to a lower frequency limit (fmin) and a second frequency of a second alternating voltage corresponds to an upper frequency limit (fmax);
determining and storing a first capacitance (C1) of the capacitor for the first frequency and a second capacitance (C2) of the capacitor for the second frequency;
determining a relative deviation of the second capacitance (C2) from the first capacitance (C1); and
determining that the operating liquid located in the operating liquid container is in a solid aggregate state when the relative deviation of the second capacitance (C2) from the first capacitance (C1) is greater than a first capacitance deviation (ΔC1).

7. The method according to claim 6, further comprising:
determining that the operating liquid located in the operating liquid container is partially in a solid and partially in a liquid aggregate state when the relative deviation of the second capacitance (C2) from the first capacitance (C1) is smaller than the first capacitance deviation (ΔC1) and greater than a second capacitance deviation (ΔC2).

8. The method according to claim 7, further comprising:
determining that the operating liquid located in the operating liquid container is in a liquid aggregate state when the relative deviation of the second capacitance (C2) from the first capacitance (C1) is smaller than a second capacitance deviation (ΔC2).

9. An operating liquid container comprising:
an interior delimited by a ceiling wall, a bottom wall, and a sidewall which connects the bottom wall to the ceiling wall;
at least one capacitor fastened to a container wall, the at least one capacitor including a first electrode and a second electrode;
an electronic evaluator which is electrically connected to the first electrode and to the second electrode,
wherein the evaluator is configured to perform a method comprising:
applying at least a first alternating voltage to the capacitor, wherein a first frequency of the first alternating voltage corresponds to a lower frequency limit (fmin);
determining and storing a first impedance of the capacitor for the first frequency;

determining a first phase angle (φ1) from the first impedance;

determining that the operating liquid located in the operating liquid container is in a solid aggregate state when the first phase angle (φ1) is greater than a first critical angle (δ1);

applying a second alternating voltage to the capacitor, wherein a second frequency of the second alternating voltage corresponds to an upper frequency limit (fmax);

determining and storing a second impedance of the capacitor for the second frequency;

determining a second phase angle (φ2) from the second impedance; and determining that the operating liquid located in the operating liquid container is partially in a solid and partially in a liquid aggregate state when the first phase angle (φ1) is smaller than the first critical angle (δ1) and a difference between the second phase angle (φ2) and the first phase angle (φ1) is greater than a second critical angle (δ2).

10. The operating liquid container according to claim 9, wherein the capacitor is embedded in the container wall.

11. The operating liquid container according to claim 10, wherein:

the bottom wall has an elevation extending into the interior of the operating liquid container; and the first electrode and the second electrode of the capacitor are embedded in the elevation.

12. The operating liquid container according to claim 11, wherein:

the container wall comprises an outer layer, an inner layer facing the interior of the operating liquid container, and a bonding layer arranged in between; and the first electrode and the second electrode of the at least one capacitor are arranged between the outer layer and the bonding layer.

13. The operating liquid container according to claim 12, wherein:

the container wall has a shielding layer and an insulating layer;

the shielding layer is arranged between the outer layer and the first and second electrodes; and the insulating layer is arranged between the shielding layer and the first and second electrodes.

14. The operating liquid container according to claim 13, wherein the insulating layer has the same dielectric conductivity as the inner layer and/or the outer layer.

* * * * *